United States Patent
Xu et al.

(10) Patent No.: US 12,100,200 B2
(45) Date of Patent: Sep. 24, 2024

(54) AUTOREGRESSION IMAGE ABNORMITY DETECTION METHOD OF ENHANCING LATENT SPACE BASED ON MEMORY

(71) Applicant: CHENGDU KOALA URAN TECHNOLOGY CO., LTD., Sichuan (CN)

(72) Inventors: Xing Xu, Sichuan (CN); Tian Wang, Sichuan (CN); Fumin Shen, Sichuan (CN); Ke Jia, Sichuan (CN); Hengtao Shen, Sichuan (CN)

(73) Assignee: CHENGDU KOALA URAN TECHNOLOGY CO., LTD., Sichuan (CN)

( * ) Notice: Subject to any disclaimer, the term of this patent is extended or adjusted under 35 U.S.C. 154(b) by 386 days.

(21) Appl. No.: 17/618,162

(22) PCT Filed: Sep. 30, 2021

(86) PCT No.: PCT/CN2021/122056
§ 371 (c)(1),
(2) Date: Dec. 10, 2021

(87) PCT Pub. No.: WO2022/095645
PCT Pub. Date: May 12, 2022

(65) Prior Publication Data
US 2023/0154177 A1    May 18, 2023

(30) Foreign Application Priority Data
Nov. 4, 2020   (CN) .................. 202011212882.X (51) Int. Cl.
G06V 10/98    (2022.01)
G06V 10/776   (2022.01)
G06V 10/82    (2022.01)

(52) U.S. Cl.
CPC ............ *G06V 10/98* (2022.01); *G06V 10/776* (2022.01); *G06V 10/82* (2022.01)

(58) Field of Classification Search
CPC ...... G06V 10/98; G06V 10/776; G06V 10/82; G06V 10/7747; G06V 10/778;
(Continued)

(56) References Cited

U.S. PATENT DOCUMENTS

2007/0036402 A1* 2/2007 Cahill .................. G06T 7/0012
382/128

FOREIGN PATENT DOCUMENTS

CN     109697974 A    4/2019
CN     109949278 A    6/2019
(Continued)

OTHER PUBLICATIONS

Abati et al: "Latent Space Autoregression for Novelty Detection"; Mar. 6, 2019; Computer Vision and Pattern Recognition; pp. 1-15 (Year: 2019).*

(Continued)

*Primary Examiner* — Siamak Harandi
(74) *Attorney, Agent, or Firm* — IP & T GROUP LLP (57) ABSTRACT

The present application discloses an autoregression image abnormity detection method of enhancing a latent space based on memory, which belongs to the field of abnormity detection in computer vision. The present application comprises: selecting a training data set; constructing a network structure of an autoregression model of enhancing a latent space based on memory; preprocessing the training data set; initializing the autoregression model of enhancing a latent
(Continued)

space based on memory; training the autoregression model of enhancing a latent space based on memory; verifying the model on the selected data set, and using the trained model to judge whether the input image is an abnormal image. In the present application, a prior distribution is not needed to be set such that the distribution of the data itself will not be destroyed, and it can prevent the model from reconstructing abnormal images, and ultimately can better judge abnormal images.

19 Claims, 5 Drawing Sheets

(58) Field of Classification Search
CPC .... G06V 10/764; G06V 20/52; G06F 18/241; G06F 18/2433; G06N 3/045; G06N 3/048; G06N 3/08
See application file for complete search history.

(56) References Cited

FOREIGN PATENT DOCUMENTS

| CN | 111598881 A | 8/2020 |
|----|-------------|--------|
| CN | 111708739 A | 9/2020 |
| CN | 112036513 A | 12/2020 |
| WO | 2018/096310 A1 | 5/2018 |

OTHER PUBLICATIONS

Gong et al.: "Memorizing Normality to Detect Anomaly: Memory-augmented Deep Autoencoder for Unsupervised Anomaly Detection"; Feb. 27, 2020; IEEE/CVF International Conference on Computer Vision; pp. 1705-1714. (Year: 2020).*
First Office Action of priority document of 202011212882.X mailed on Dec. 10, 2020.
The Second Office Action of priority document of 202011212882.X mailed on Dec. 31, 2020.
The Third Office Action of priority document of 202011212882.X on Jan. 14, 2021.
Notification to Grant Patent Right for Invention of priority document 202011212882.X.
First search of priority document 202011212882.X.
Supplementary search of priority document 202011212882.X.
Abati D et al., Latent Space Autoregression for Novelty Detection, Computer Vision and Pattern Recognition, Mar. 6, 2019.
Gong et al., Memorizing Normality to Detect Anomaly: Memory-augmented Deep Autoencoder for Unsupervised Anomaly Detection, Feb. 27, 2020, pp. 1705-1714, 2019 IEEE/CVF International Conference on Computer Vision.
International Search Report for the International Application No. PCT/CN2021/122056 issued by the International Searching Authority (Chinese Intellectual Property Office) on Dec. 30, 2021.
Written Opinion for International Application No. PCT/CN2021/122056 issued by the International Searching Authority (Chinese Intellectual Property Office) on Dec. 30, 2021.

* cited by examiner

| Model | OC SVM | KDE | DAE | VAE | Pix CNN | GAN | OC GAN | AND | ours |
|---|---|---|---|---|---|---|---|---|---|
| 0 | 0.988 | 0.885 | 0.991 | 0.998 | 0.531 | 0.926 | 0.998 | 0.993 | 0.998 |
| 1 | 0.999 | 0.996 | 0.999 | 0.999 | 0.995 | 0.995 | 0.999 | 0.999 | 0.999 |
| 2 | 0.902 | 0.710 | 0.891 | 0.962 | 0.476 | 0.805 | 0.942 | 0.959 | 0.977 |
| 3 | 0.950 | 0.693 | 0.935 | 0.947 | 0.517 | 0.818 | 0.963 | 0.966 | 0.971 |
| 4 | 0.955 | 0.844 | 0.921 | 0.965 | 0.739 | 0.823 | 0.975 | 0.956 | 0.967 |
| 5 | 0.968 | 0.776 | 0.937 | 0.963 | 0.542 | 0.803 | 0.980 | 0.964 | 0.974 |
| 6 | 0.978 | 0.861 | 0.981 | 0.995 | 0.592 | 0.890 | 0.991 | 0.994 | 0.996 |
| 7 | 0.965 | 0.884 | 0.964 | 0.974 | 0.789 | 0.898 | 0.981 | 0.980 | 0.985 |
| 8 | 0.853 | 0.669 | 0.841 | 0.905 | 0.340 | 0.817 | 0.939 | 0.953 | 0.959 |
| 9 | 0.955 | 0.825 | 0.960 | 0.978 | 0.662 | 0.887 | 0.981 | 0.981 | 0.983 |
| avg | 0.951 | 0.814 | 0.942 | 0.969 | 0.618 | 0.866 | 0.975 | 0.975 | 0.981 |

FIG. 6

| Model | OC SVM | KDE | DAE | VAE | Pix CNN | GAN | OC GAN | AND | ours |
|---|---|---|---|---|---|---|---|---|---|
| 0 | 0.630 | 0.658 | 0.718 | 0.688 | 0.788 | 0.708 | 0.757 | 0.735 | 0.757 |
| 1 | 0.440 | 0.520 | 0.401 | 0.403 | 0.428 | 0.458 | 0.531 | 0.580 | 0.577 |
| 2 | 0.649 | 0.657 | 0.685 | 0.679 | 0.617 | 0.664 | 0.640 | 0.690 | 0.685 |
| 3 | 0.487 | 0.497 | 0.556 | 0.528 | 0.574 | 0.510 | 0.620 | 0.542 | 0.547 |
| 4 | 0.735 | 0.727 | 0.740 | 0.748 | 0.511 | 0.722 | 0.723 | 0.761 | 0.778 |
| 5 | 0.500 | 0.496 | 0.547 | 0.519 | 0.571 | 0.505 | 0.620 | 0.546 | 0.602 |
| 6 | 0.725 | 0.758 | 0.642 | 0.695 | 0.422 | 0.707 | 0.723 | 0.751 | 0.772 |
| 7 | 0.533 | 0.564 | 0.497 | 0.500 | 0.454 | 0.471 | 0.575 | 0.535 | 0.554 |
| 8 | 0.649 | 0.680 | 0.724 | 0.700 | 0.715 | 0.713 | 0.820 | 0.717 | 0.747 |
| 9 | 0.508 | 0.540 | 0.389 | 0.398 | 0.426 | 0.458 | 0.554 | 0.548 | 0.716 |
| avg | 0.586 | 0.610 | 0.590 | 0.586 | 0.551 | 0.592 | 0.657 | 0.641 | 0.673 |

FIG. 7

AUTOREGRESSION IMAGE ABNORMITY DETECTION METHOD OF ENHANCING LATENT SPACE BASED ON MEMORY

CROSS-REFERENCES TO RELATED APPLICATION

This application is a National Phase application of PCT application no. PCT/CN2021/122056 filed on Sep. 30, 2021, which claims the priority of a Chinese patent application filed with the State Intellectual Property Office of China, on Nov. 4, 2020, with the application number 202011212882.X, entitled "Autoregression Image Abnormity Detection Method of Enhancing Latent Space Based on Memory", all content of which is incorporated in the present application by reference.

TECHNICAL FIELD

The present application relates to the field of abnormity detection in computer vision, and in particular, to an autoregression image abnormity detection method of enhancing a latent space based on memory.

BACKGROUND ART

Abnormity detection, also known as outlier detection, novelty detection, etc., is a detection process in which objects whose behavior is significantly different from that of an expected object are found. These detected objects are also called as abnormal points or outliers. Abnormity detection is widely used in production activities and life, such as, credit card anti-fraud, advertisement click anti-cheating, network intrusion detection, and so on.

With rise of deep learning in recent years, research on the use of abnormity detection in computer vision has begun to flourish. The abnormity detection in computer vision meets the definition of abnormity detection, wherein an image, video and other information are regarded as the input object. For example, objects are found from a large number of images with the found objects not conforming to the type of images; components which are wrongly produced are detected during the industrial production; and the abnormity detection is used to surveillance videos to automatically analyze abnormal behaviors, objects and the like in surveillance videos. Due to the fiery development of computers and the rapid expansion of data, a technology capable of analyzing information such as images and videos is urgently demanded.

With the development of machine learning, especially deep learning technology, image abnormity detection technologies based on machine learning emerge continuously. Compared with traditional abnormity detection, more compact information expression needs to be extracted for images. In the stage of the traditional machine learning, abnormity detection requires manually analyzing the data distribution, designing appropriate characteristics, and then using the traditional machine learning algorithms (support vector machines, isolation forests, etc.) to model and analyze the data. Compared with traditional machine learning, deep learning can automatically learn the characteristics of the data and then perform modeling and analysis on the characteristics, which has higher robustness.

At present, the abnormity detection methods in computer vision mainly include: methods based on reconstruction loss differences, methods based on classification learning, and methods based on density estimation.

1) The method based on reconstruction loss difference:
   In this type of methods, usually, the input data is reconstructed, using the characteristics of the data itself, through a deep autoencoder, wherein the autoencoder is used to be able to remember the characteristics of normal samples, and it is judged whether the data is an abnormal sample by reconstruction difference (usually the abnormal samples cannot be reconstructed well, and the abnormal samples can be detected by setting a threshold).
2) The method based on classification learning:
   This type of methods is mainly used for outlier detection, wherein usually, normal samples are a group of data with label information, and by applying classification algorithms to this group of data, the probability that the data belongs to a certain class can be learned, wherein during the testing stage, the value of the probability that a normal sample belongs to a certain class is very large, and because the abnormal sample does not belong to this distribution, the value of the probability that it belongs to all classes is very small, based on which characteristic, whether the data is abnormal data is distinguished.
3) The method based on density estimation:
   This kind of method is often aimed at the situation in which a small part of a large amount of data are abnormal samples, wherein the data is modeled, using a method of traditional machine learning or deep learning to extract characteristics, through applying the density estimation method, wherein the abnormal data is often located in the part where the probability value is relatively low.

Of course, many algorithms, that are variants and combinations of the above algorithms, may be used to achieve the effect of abnormity detection, including the combination of autoencoder and generated confrontation network, and the combination of autoencoder and density estimation method.

However, the existing abnormity detection methods, since lacking clear supervision information (abnormal data is difficult to be collected, and the collection of normal data is too time-consuming and laborious to obtain complete data), are difficult to achieve good effects. Especially the model based on the deep autoencoder lacks a good solution to the problems of large data distribution and large data variance, etc.

SUMMARY

The present application provides an autoregression image abnormity detection method of enhancing a latent space based on memory that can better determine abnormal images.

The technical solution adopted by the present application for solving its technical problems is as follows.

An autoregression image abnormity detection method of enhancing a latent space based on memory may comprise following steps:

Step 1. selecting a data set, and dividing the data set into a training set and a test set, Step 2. constructing a network structure of an autoregression model of enhancing a latent space based on memory;

Step 3. preprocessing the training set;

Step 4. initializing the autoregression model of enhancing a latent space based on memory;

Step 5. using the preprocessed training set to train the initialized autoregression model of enhancing a latent space based on memory; and Step 6. verifying the trained autoregression model of enhancing a latent space based on memory through the test set, and using the trained autoregression model of enhancing a latent space based on memory to judge whether an input image is an abnormal image.

Optionally, in Step 1, the data set may comprise a MNIST data set and a CIFAR10 data set.

Optionally, in Step 2, the autoregression model of enhancing a latent space based on memory may comprise: an autoencoder, an autoregression module and a memory module, wherein the autoencoder may comprises an encoder and a decoder, wherein the autoencoder may compress an image into a latent space through the encoder, learns a characteristic expression, and then may use the decoder to decode the characteristic expression of the latent space back to an image space;

the autoregression module may be configured to model the data using the characteristics of the latent space and fit to a true distribution, with a fitting process expressed by following formula:

$$p(z) = \prod_{i=1}^{d} p(z_i \mid z_{<i});$$

where $p(z)$ is a latent space distribution; $p(z_i|z_{<i})$ is a conditional probability distribution; d represents dimension of the feature vector z; $z_i$ represents the ith dimension of the feature vector z; $z_{<i}$ represents the part of the feature vector z less than the ith dimension;

the memory module may be configured to store the characteristic expression of the latent space, and then the characteristic expression that does not belong to the latent space will be forcibly converted into a most relevant characteristic expression in the memory by the memory module, with a process as follows:

$$\hat{z} = wM = \sum_{i=1}^{N} w_i * m_i;$$

where is the memory module, $\hat{z}$ is the expression to the characteristic, by the memory module, $W$ represents the similarity between the latent space and each piece of memory, $m_i$ represents the ith block of memory of the memory module, $W_i$ represents the similarity between the feature vector z and $m_i$, N represents the size of the memory module, $$w_i = \frac{\exp(d(z, m_i))}{\sum_{j=1}^{N} \exp(d(z, m_j))},$$

$$d(z, m_i) = \frac{z m_i^T}{\|z\| \|m_i\|};$$

where exp( ) represents an exponential function with e as a base, $\|\cdot\|$ is a modulus operation, $m_i^T$ is transposition of $m_i$, and $m_j$ represents the jth block of memory of the memory module.

Optionally, in Step 2, in the network structure:

an encoder network structure of the autoencoder may comprise a down-sampling module, a down-sampling module and a fully connected layer, wherein each block uses a residual network structure and consists of three consecutive structures, namely convolutional layer+batch normalization+activation function, in cascade;

a decoder network structure of the autoencoder may comprise a fully connected layer, an up-sampling module, an up-sampling module, and a convolutional layer wherein each block uses a residual network structure, and consists of three structures in cascade, whose sub-structures are respectively: transposed convolutional layer+batch normalization+activation function; convolutional layer+batch normalization+activation function; and transposed convolutional layer+batch normalization+activation function;

a network structure of the autoregression module can be composed of multiple autoregression layers, wherein an encoder in the autoencoder is expressed as a mathematical mode: $z=en(X)$ and the decoder is expressed as a mathematical mode: $\hat{X}=de(z)$ the autoregression module $z_{dist}=H(z)$ and $\hat{z}$ act on Z, and at this time $\hat{X}=de(\hat{z})$.

Optionally, the autoencoder may process an image with a processing comprising following steps of:

a. inputting an image with a size of N*N, wherein after an encoding stage of the autoencoder, its size of the autoregression model of enhancing a latent space based on memory becomes 2 times smaller after being subjected to the down-sampling module once, dimensions of a channel are in number which changes from 1 to 32, and further to 64, and finally, it is input to the fully connected layer in the encoder after a leveling operation, and finally the latent space $z \in R^{64}$ is obtained, and at this time $\hat{z} \in R^{64}$;

b. sending z to the memory module to obtain a similarity $W$ between Z and each block of memory, and performing, for one time, an operation of $$h(w_i; y) = \begin{cases} w_i, & \text{if } w_i > y \\ 0, & \text{otherwise} \end{cases}$$

on $W$ to obtain $\hat{w}$, and finally making $$\hat{z} = \hat{w}M = \sum_{i=1}^{N} \hat{w}_i * m_i$$

expressed by the memory;

c. making $\hat{z} \in R^{64}$ subjected to the fully connected layer of the decoder to obtain a characteristic of size of $$64 * \frac{N}{4} * \frac{N}{4},$$

and finally restoring to an original size after being subjected to the up-sampling module for two times, with dimensions of the channel of the up-sampling module in number which changes from 64 to 32, and further to 16; and     d. restoring the characteristics to an original image space through a last convolutional layer.

Optionally, Step 2 may specifically comprise following steps:

Step 201: selecting a training set;

Step 202: analyzing information of the training set, wherein the training set information comprises image size, image intensity, and image noise;

Step 203: constructing a network structure applicable to current data according to the obtained information; and Step 204: assembling the autoencoder, the autoregression module and the memory module together.

Optionally, Step 3 may specifically comprise following steps:

Step 301: reading image data;

Step 302: adjusting size of the image to a specific size;

Step 303: processing a certain amount of images that are different from an image space of overall data, which is specifically: transferring a gray space to a RGB space and a RGB space to a gray space; and Step 304: performing a regularization operation on the image data.

Optionally, Step 4 may be specifically: using different initialization methods to initialize a network, namely: using a random initialization method for the autoencoder and the autoregression module, and using a uniformly distributed initialization for the memory module.

Optionally, Step 5 may specifically comprise following steps:

Step 501: loading the preprocessed data;

Step 502: setting learning rates for the autoencoder, the autoregression module, and the memory module, respectively;

Step 503: fixing the memory module and training the autoregression module;

Step 504: fixing the autoregression module and training the memory module; and

Step 505: performing Step 503 and Step 504 iteratively until the autoregression model of enhancing a latent space based on memory converges.

Optionally, in Step 5, the model may have a loss function of:

$$L = L_{rec} + \alpha L_{llk} + \beta L_{mem};$$

where $L_{rec}$ represents a reconstruction loss of an original image with respect to a reconstructed image;

$$L_{llk} = \sum_{i=1}^{N} \log(z_{dist})$$

represents a negative log likelihood loss;

$$L_{mem} = \sum_{i=1}^{T} -\hat{w}_i \log(\hat{w}_i)$$

represents an entropy of a weight coefficient of the characteristic and the memory module; and α, β respectively represent the weight coefficients of the loss function to balance a ratio of different losses. α, β are different for different data sets. As for MNIST and CIFAR10, α is equal to 1, and 0.1, respectively, and β is equal to 0.0002, and 0.0002, respectively.

Optionally Step 6 may specifically be: using a trained autoregression model of enhancing a latent space based on memory to input an image into the autoregression model of enhancing a latent space based on memory; acquiring a probability output by the autoregression module and a reconstruction difference between a reconstructed image of the autoencoder and the original image, respectively regarded as two fractions, and adding the two fractions to obtain a final fraction; and determining whether it is an abnormal image based on a previously set threshold.

The beneficial effects of the present application at least comprise the following.

Through the above-mentioned autoregression image abnormity detection method of enhancing a latent space based on memory, by constructing and training an autoregression model of enhancing a latent space based on memory, a prior distribution is not needed to be set such that the distribution of the data itself will not be damaged, and it can prevent the model from reconstructing abnormal images, and ultimately can better judge abnormal images.

DETAILED DESCRIPTION OF EMBODIMENTS

The technical solutions of the present application will be described in detail below with reference to the drawings and embodiments.

Figure 1:
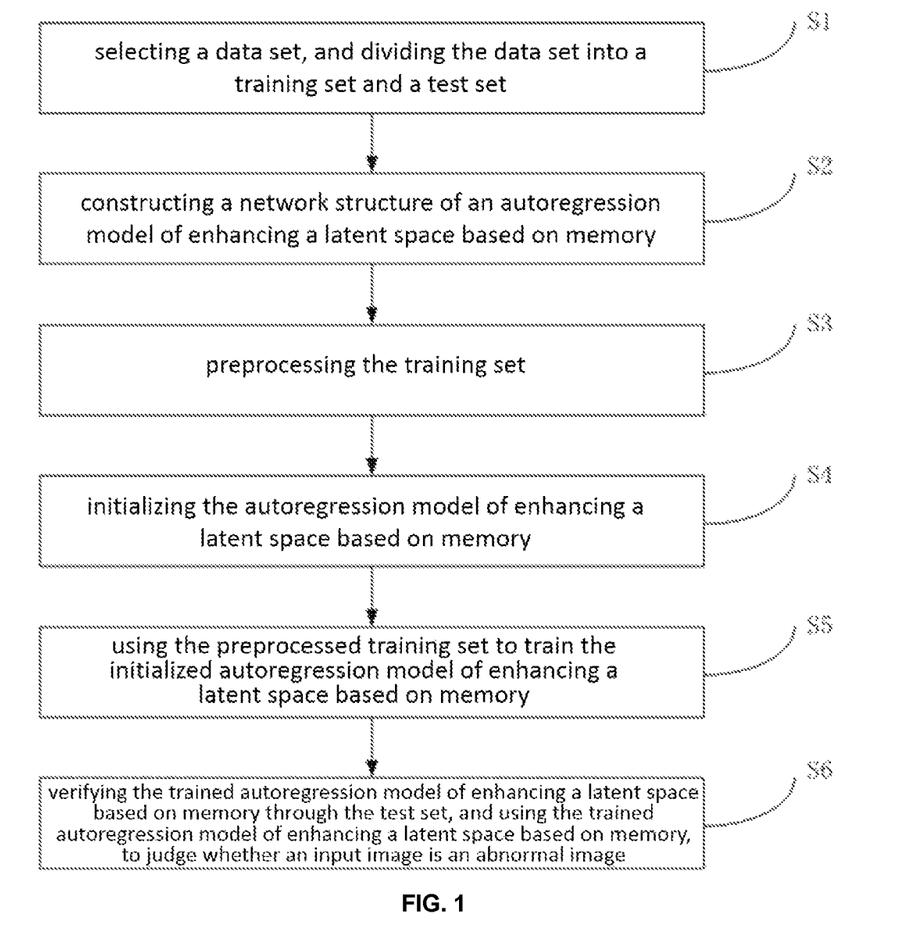
FIG. 1 is a flowchart of an autoregression image abnormity detection method of enhancing a latent space based on memory in an embodiment of the application.

This embodiment proposes an autoregression image abnormity detection method of enhancing a latent space based on memory. The flowchart is shown in FIG. 1, wherein the method may include the following steps.

S1: selecting a data set, and dividing the data set into a training set and a test set.

In this embodiment, two mainstream image abnormity detection data sets are selected for experimentation, capable of including MNIST and CIFAR10.

The MNIST data set is a handwritten data set that many tasks will choose. It totally contains a training set of 60,000 examples and a test set of 10,000 examples. The data set can contain handwritten characters of digits 0-9, in 10 categories totally. Each image is a gray-scale image with a size of 28*28.

The CIFAR10 data set is a color image data set that is more related to universal objects. Totally, it contains training data of 50,000 images and test data of 10,000 images. It totally contains 10 categories of color RGB images: airplanes, cars, birds, cats, deer, and dogs, frogs, horses, boats, and trucks, wherein each picture is a 32*32 color image.

The above two data sets are selected for verifying the adaptability and robustness of the model with respect to different types of data sets. Both MNIST and CIFAR10 contain 10 categories. Most experiments will choose these two data sets. 10 categories can be adaptable very well to the background setting of abnormity detection, and provide the characteristics of data diversity.

S2: constructing a network structure of an autoregression model of enhancing a latent space based on memory.

Figure 2:
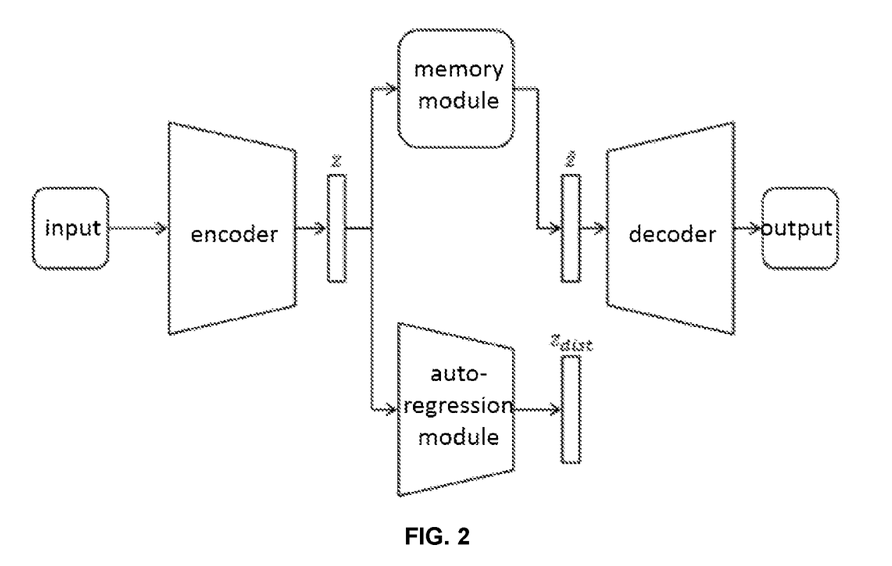
FIG. 2 is a schematic diagram of a network structure of an autoregression model of enhancing a latent space based on memory in an embodiment of the application.
Figure 3:
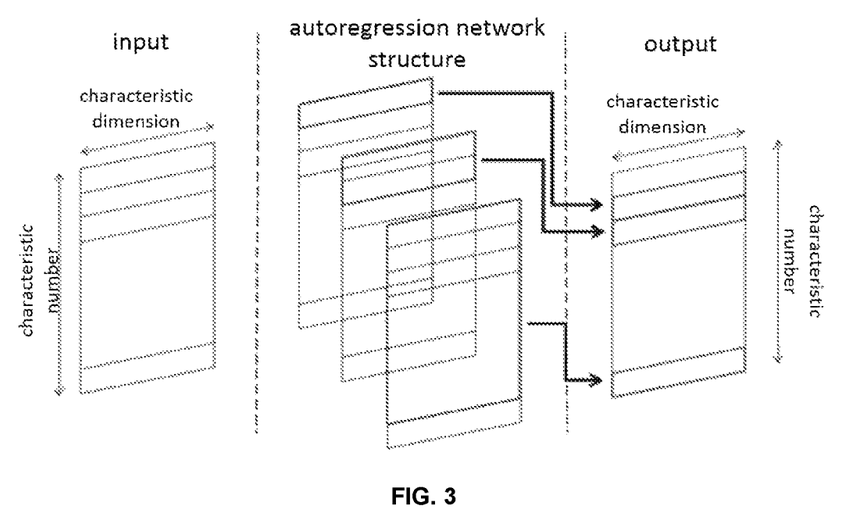
FIG. 3 is a schematic diagram of an autoregression module in an embodiment of the application.
Figure 4:
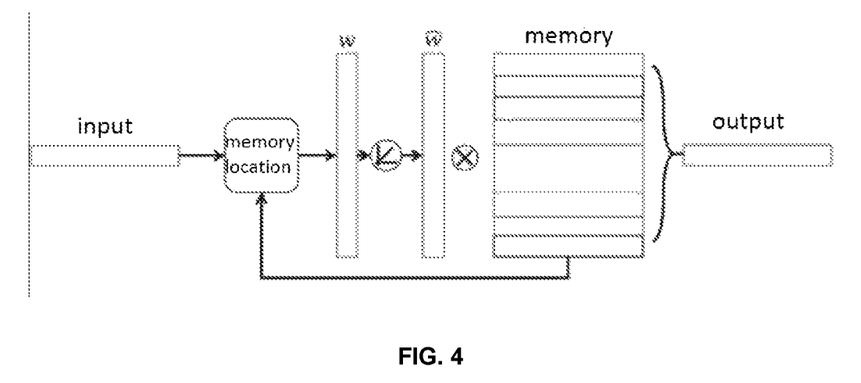
FIG. 4 is a schematic diagram of a memory module in an embodiment of the application.

As shown in FIGS. 2, 3, 4, and 5, the autoregression model of enhancing a latent space based on memory in this embodiment can include three parts: an autoencoder, an autoregression module, and a memory module, wherein:

the autoencoder may comprise an encoder and a decoder, wherein the autoencoder compresses an image into a latent space through the encoder, so as to learn a characteristic expression, and then uses the decoder to decode the characteristic expression of the latent space back to an image space;

the autoregression module may be configured to model the data using the characteristics of the latent space and fit to a true distribution, with a fitting process expressed by following formula:

$$p(z) = \prod_{i=1}^{d} p(z_i \mid z_{<i});$$

where p(z) is a latent space distribution; $p(z_i|z_{<i})$ is a conditional probability distribution; d represents dimension of the feature vector z; $z_i$ represents the ith dimension of the feature vector z; $z_{<i}$ represents the part of feature vector z less than the ith dimension, wherein the autoregressive module is used to learn the distribution of the data, which will not be same as the variational autoencoder and the adversarial autoencoder, both of which set a prior distribution for the data. The setting of the prior distribution will damage the distribution of the data itself. Using the autoregressive module can effectively avoid this problem; and the memory module may be configured to store the characteristic expression of the latent space, and then the characteristic expression that does not belong to the latent space will be forcibly converted into a most relevant characteristic expression in the memory by the memory module, with a process as follows:

$$\hat{z} = wM = \sum_{i=1}^{N} w_i * m_i;$$

where is the memory module, $\hat{z}$ is an expression to the characteristic, by the memory module, $W$ represents a similarity between the latent space and each piece of memory, $m_i$ represents the ith block of memory of the memory module, $W_i$ represents a similarity between the feature vector z and $m_i$, N represents size of the memory module, $$w_i = \frac{\exp(d(z, m_i))}{\sum_{j=1}^{N} \exp(d(z, m_j))},$$

$$d(z, m_i) = \frac{zm_i^T}{\|z\|\|m_i\|};$$

where exp( ) represents an exponential function with e as base, ‖•‖ is a modulus operation, $m_i^T$ is transposition of $m_i$, and $m_j$ represents the jth block of memory of the memory module.

Here, the memory module is used to store the distributed sparse characteristic expression, which strengthens the generation effect of the autoencoder, and limits the weight, which effectively prevents the problem that the model can reconstruct abnormal images.

Figure 5:
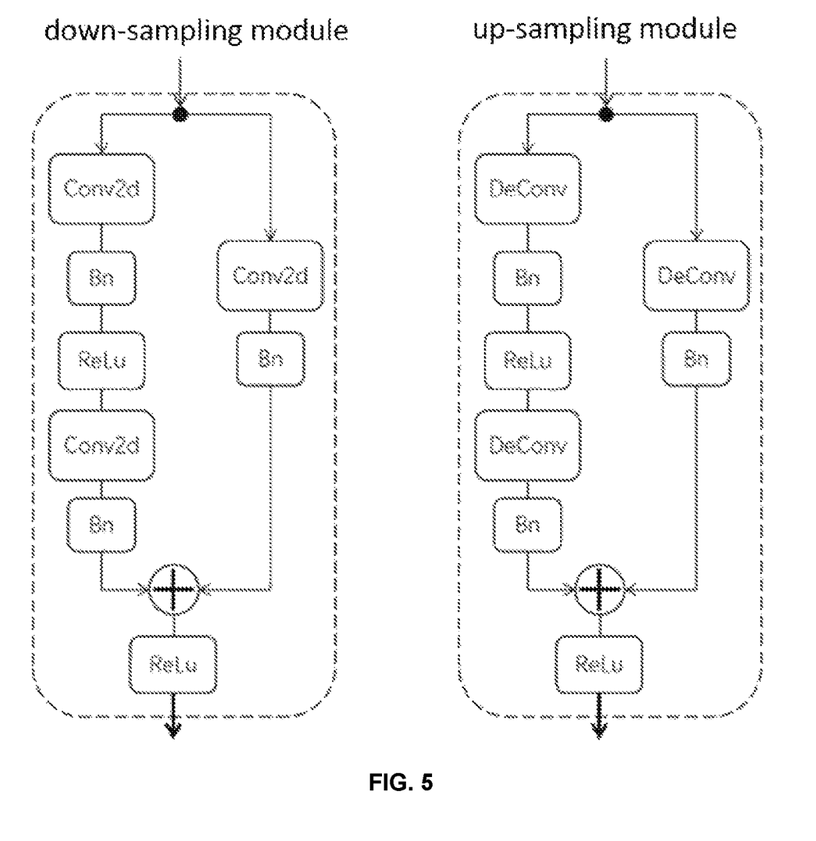
FIG. 5 is a schematic diagram of the up-sampling and down-sampling modules in an embodiment of the application.

See FIG. 5, which is a schematic diagram of the up- and down-sampling modules, wherein Conv2d represents the convolutional layer, Bn represents the batch normalization, ReLu represents the activation function, and DeConv represents the transposed convolutional layer. Here, the encoder network structure of the autoencoder can include a down sampling module, a down sampling module, and a fully connected layer. Each block uses a residual network structure and is composed of three consecutive structures, convolutional layer+batch normalization+activation function, in cascade.

In this embodiment, the decoder network structure of the autoencoder may include a fully connected layer, an up sampling module, an up sampling module, and a convolutional layer. Each block uses a residual network structure, and is composed of three structures, whose sub-structures can be respectively transposed convolutional layer+batch normalization+activation function, convolutional layer+batch normalization+activation function, transposed convolutional layer+batch normalization+activation function, in cascade.

The network structure of the autoregression module is constructed using the structure shown in FIG. 3. FIG. 3 represents a running process of an autoregression layer. The number of characteristics input and output remains unchanged, and the characteristic dimension will change. Each autoregression layer is implemented by multiple mutation fully connected layers. The current characteristics are generated using the previous characteristics of the feature vector, and finally assembled into a feature vector. The autoregression network is composed of multiple such autoregression layers.

The network structure of the memory module can be constructed by using the structure shown in FIG. 4. FIG. 4 shows the reading mechanism of the memory module. First, an extra memory space is selected as the memory, and the size of each memory block is consistent with the size of the input. The similarity between the input and each block of memory is calculated first, and then the similarity undergoes a filtering operation (filtering out the similarity with a relatively small value), and the similarity is multiplied by each block of memory and then the two are added to obtain the output.

It should be pointed out that the encoder in the autoencoder is expressed by the mathematical mode of: z=en(X) and the decoder is expressed by the mathematical mode of: $\hat{X}$=de(z), and the autoregression module $z_{dist}$=H(z) and $\hat{z}$ act on Z, at this time $\hat{X}$=de($\hat{z}$).

In a specific application process, the process that the autoencoder processes an image may include the following steps:

a. inputting one image with a size of N*N, wherein after an encoding stage of the autoencoder, its size of the autoregression model of enhancing a latent space based on memory becomes 2 times smaller after being subjected to the down-sampling module once, dimensions of a channel are in number which becomes from 1 to 32, and further to 64, and finally, it is input to the fully connected layer in the encoder after a leveling operation, and finally the latent space $z \in R^{64}$ is obtained, and at this time $\hat{z} \in R^{64}$;

b. sending z to the memory module to obtain a similarity $W$ between Z and each block of memory, and performing, for one time, an operation of $$h(w_i; y) = \begin{cases} w_i, & \text{if } w_i > y \\ 0, & \text{otherwise} \end{cases}$$

on $W$ to obtain $\hat{W}$ and finally making $$\hat{z} = \hat{w}M = \sum_{i=1}^{N} \hat{w}_i * m_i$$

expressed by the memory;

c. making $z \in R^{64}$ subjected to the fully connected layer of the decoder to obtain a characteristic of size of $$64 * \frac{N}{4} * \frac{N}{4},$$

and finally restoring to an original size after being subjected to the up-sampling module for two times, with dimensions of the channel of the up-sampling module in number which changes from 64 to 32, and further to 16; and d. restoring the characteristics to an original image space through a last convolutional layer.

S3: preprocessing the training set.

In the process of training the model, it is necessary to adjust the size of all images to N*N and convert them to the corresponding image space. According to the needs of the data, the operations, such as random rotation, flipping, and noise, can be appropriately used.

S4: initializing the autoregression model of enhancing a latent space based on memory.

Since the model initialization can effectively help the network to be trained and converge, the scheme adopted here is to use random initialization method for the autoencoder module and autoregression module. The process of random initialization is to ensure that the network weight is as small as possible, and the deviation is set to zero.

As for the memory module $M \in R^{N*feature\_dim}$, N represents the size of the memory module, feature_dim means that the size of the information stored in each block of memory is consistent with dimension of the latent space. As for $\forall n \in N$, the uniform distribution $\pi \sim U(0,1)$ is used to perform feature_dim operation for the initialization, that is: any n belongs to N, and every small block in the memory is initialized.

S5: using the preprocessed training set to train the initialized autoregression model of enhancing a latent space based on memory.

In the training process, two data sets, MNIST and CIFAR10, are mainly used.

Here, the size of the image input to the network is 28*28 and 32*32, respectively, feature_dim is all set to 64, the output dimension of the autoregression module is all 100, the numbers of memory are respectively set to 100 and 500, and the Batch_Size size is all 256. The learning rates are set to 0.0001 and 0.001, respectively. The Adam optimizer is used for learning. The total epoch is set to 100, and the learning rate is multiplied by 0.1 every 20 epochs. Here, the memory module proposes to use uniform distribution for initialization and set a separate learning rate, which effectively solves the problem that the memory module is difficult to be trained.

In addition, the loss function of the model is as follows:

$$L = L_{rec} + \alpha L_{llk} + \beta L_{mem};$$

where $L_{rec}$ represents the reconstruction loss of the original image with respect to the reconstructed image, $$L_{llk} = -\sum_{i=1}^{N} \log(z_{dist})$$

represents the negative log likelihood loss, $$L_{mem} = \sum_{i=1}^{T} -\hat{w}_i \log(\hat{w}_i)$$

represents the entropy of the weight coefficient of the characteristic and the memory module, and $\alpha$, $\beta$ respectively represent the weight coefficient of the loss function to balance the ratio of different losses. $\alpha$, $\beta$ are different for different data sets. For MNIST and CIFAR10, $\alpha$ are equal to 1, and 0.1, respectively, and $\beta$ are 0.0002, and 0.0002, respectively.

S6: verifying the trained autoregression model of enhancing a latent space based on memory through the test set, and using the trained autoregression model of enhancing a latent space based on memory, to judge whether an input image is an abnormal image.

This embodiment mainly uses the area AUC under the ROC curve to evaluate the pros and cons of the method. Usually this indicator is calculated based on four elements of the confusion matrix of the classification problem: True Positive (TP), False Positive (FP), False Negative (FN) and True Negative (TN), wherein the confusion matrix is shown in Table 1 below:

TABLE 1

|  | Predicted as abnormal | Predicted as normal |
|---|---|---|
| Actually abnormal | True Positive (TP) | False Negative (FN) |
| Actually normal | False Positive (FP) | True Negative (TN) |

In addition, the following formula is calculated:

$$\text{True Positive Rate}(TPR) = \frac{TP}{TP + FN}$$

$$\text{False Positive Rate }(FPR) = \frac{FP}{FP+TN}$$

$$\text{True Negative Rate}(TNR) = \frac{TN}{FP+TN}$$

The ROC curve is composed of two coordinates, i.e. the abscissa FPR and the ordinate TPR. One curve can be drawn by adjusting different thresholds. AUC is the area size of the part lower than the curve.

In addition, the performance of the model can be tested on the two data sets of MNIST and CIFAR10, respectively, which always achieves good performance compared with the current popular methods. The test comparison results are shown in FIGS. 6 and 7, wherein FIG. 6 is a comparison table of model performance (AUC) on the MNIST data set, and FIG. 7 is a comparison table of model performance (AUC) on the CIFAR10 data set.

Figure 6:
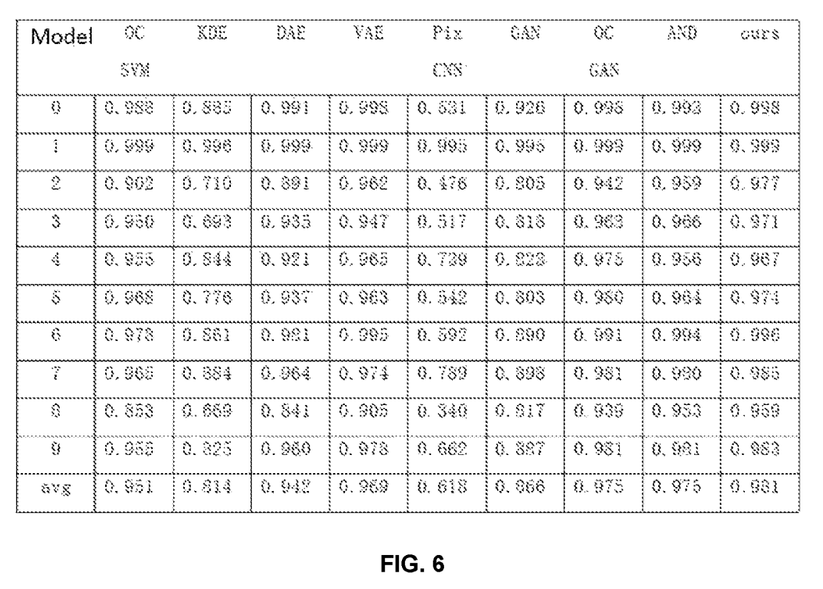
FIG. 6 is a comparison table of model performance (AUC) on the MNIST data set.
Figure 7:
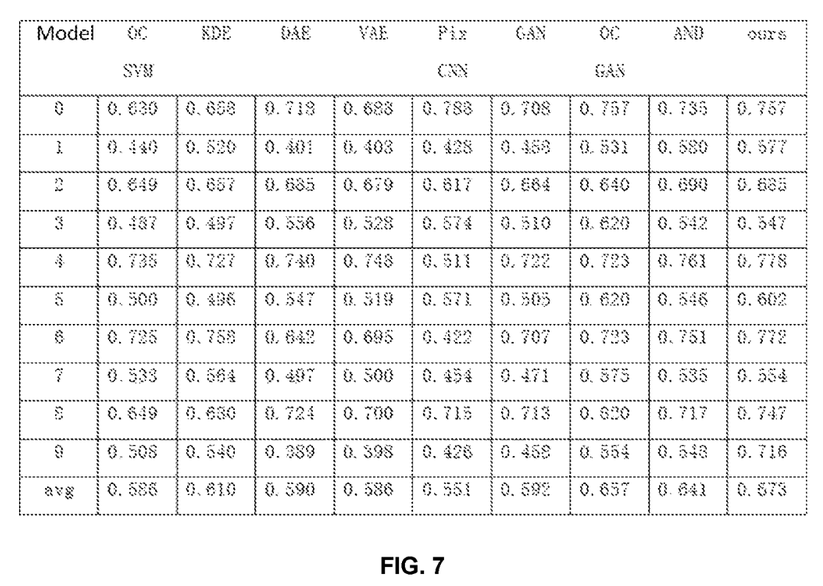
FIG. 7 is a comparison table of model performance (AUC) on the CIFAR10 data set.

It can be seen from FIG. 6 that this embodiment is better than the existing method in individual category of the MNIST data set. The final avg score of the method in this embodiment reaches 0.981, which is the best performance so far. It can be seen from FIG. 7 that the performance of this embodiment on the 4, 6, and 9 of the CIFAR10 data set has been greatly improved, and the final avg score reaches 0.673, which is the best performance so far. This proves that the autoregression model of enhancing a latent space based on memory proposed in the present application can be effectively applied to image abnormity detection and can greatly compensate for the shortcomings of the existing methods.

INDUSTRIAL APPLICABILITY

The present application provides an autoregression image abnormity detection method of enhancing a latent space based on memory, which belongs to the field of abnormity detection in computer vision. The present application comprises: selecting a training data set; constructing a network structure of an autoregression model of enhancing a latent space based on memory; preprocessing the training data set; initializing the autoregression model of enhancing a latent space based on memory; training the autoregression model of enhancing a latent space based on memory; and verifying the model on the selected data set, and using the trained model to judge whether the input image is an abnormal image. The present application does not need to set a prior distribution such that the distribution of the data itself will not be damaged, and it can prevent the model from reconstructing abnormal images, and ultimately can better judge abnormal images.

In addition, it can be understood that the autoregression image abnormity detection method of enhancing a latent space based on memory of the present application is reproducible and can be used in a variety of industrial applications. For example, the autoregression image abnormity detection method of enhancing a latent space based on memory of the present application can be used in applications that require the image abnormity detection.

What is claimed is:

1. An autoregression image abnormity detection method of enhancing a latent space based on memory, comprising following steps:
Step 1: selecting a data set, and dividing the data set into a training set and a test set;
Step 2: constructing a network structure of an autoregression model of enhancing a latent space based on memory;
Step 3: preprocessing the training set;
Step 4: initializing the autoregression model of enhancing a latent space based on memory;
Step 5: using the preprocessed training set to train the initialized autoregression model of enhancing a latent space based on memory; and
Step 6: verifying the trained autoregression model of enhancing a latent space based on memory through the test set, and using the trained autoregression model of enhancing a latent space based on memory, to judge whether an input image is an abnormal image;
wherein Step 2 specifically comprises following steps:
Step 201: selecting a training set;
Step 202: analyzing information of the training set, wherein the training set information comprises image size, image intensity, and image noise;
Step 203: constructing a network structure applicable to current data according to the obtained information; and
Step 204: assembling an autoencoder, an autoregression module and a memory module together.

2. The autoregression image abnormity detection method of enhancing a latent space based on memory according to claim 1, wherein in Step 1, the data set comprises a MNIST data set and a CIFAR10 data set.

3. The autoregression image abnormity detection method of enhancing a latent space based on memory according to claim 2, wherein in Step 2, the autoregression model of enhancing a latent space based on memory comprises: an autoencoder, an autoregression module and a memory module, wherein
the autoencoder comprises an encoder and a decoder, wherein the autoencoder compresses an image into a latent space through the encoder, learns a characteristic expression, and then uses the decoder to decode the characteristic expression of the latent space back to an image space;
the autoregression module is configured to model data using characteristics of the latent space and fit to a true distribution, with a fitting process expressed by following formula:

$$p(z) = \prod_{i=1}^{d} p(z_i \mid z_{<i});$$

where p(z) is a latent space distribution; $p(z_i|z_{<i})$ is a conditional probability distribution; d represents dimension of a feature vector z; $z_i$ represents an ith dimension of the feature vector z; $z_{<i}$ represents a part of the feature vector z less than the ith dimension;
the memory module is configured to store the characteristic expression of the latent space, and then a characteristic expression that does not belong to the latent space will be forcibly converted into a most relevant characteristic expression in a memory by the memory module, with a process as follows:

$$\hat{z} = wM = \sum_{i=1}^{N} w_i * m_i;$$

where M is the memory module, ẑ is an expression to the characteristic, by the memory module, w represents a similarity between the latent space and each piece of memory, $m_i$ represents an ith block of memory of the memory module, $w_i$ represents a similarity between the feature vector z and $m_i$, N represents size of the memory module, $$w_i = \frac{\exp(d(z, m_i))}{\sum_{j=1}^{N} \exp(d(z, m_j))},$$

$$d(z, m_i) = \frac{z m_i^T}{\|z\| \|m_i\|};$$

where exp( ) represents an exponential function with e as base, $\|\cdot\|$ is a modulus operation, $m_i^T$ is transposition of $m_i$, and $m_j$ represents a jth block of memory of the memory module.

4. The autoregression image abnormity detection method of enhancing a latent space based on memory according to claim 2, wherein in Step 2, in the network structure:
an encoder network structure of the autoencoder comprises a down-sampling module, a down-sampling module and a fully connected layer, wherein each block uses a residual network structure and consists of three consecutive structures, namely convolutional layer+batch normalization+activation function, in cascade;
a decoder network structure of the autoencoder comprises a fully connected layer, an up-sampling module, an up-sampling module, and a convolutional layer wherein each block uses a residual network structure, and consists of three structures in cascade, whose sub-structures are respectively: transposed convolutional layer+batch normalization+activation function; convolutional layer+batch normalization+activation function; and transposed convolutional layer+batch normalization+activation function;
a network structure of the autoregression module is composed of multiple autoregression layers,
wherein an encoder in the autoencoder is expressed as a mathematical mode of z=en(X), and a decoder is expressed as a mathematical mode of X̂=de(z), the autoregression module $z_{dist}$=H(z) and ẑ act on z, and at this time X̂=de(ẑ).

5. The autoregression image abnormity detection method of enhancing a latent space based on memory according to claim 1, wherein in Step 2, the autoregression model of enhancing a latent space based on memory comprises: an autoencoder, an autoregression module and a memory module, wherein
the autoencoder comprises an encoder and a decoder, wherein the autoencoder compresses an image into a latent space through the encoder, learns a characteristic expression, and then uses the decoder to decode the characteristic expression of the latent space back to an image space;
the autoregression module is configured to model data using characteristics of the latent space and fit to a true distribution, with a fitting process expressed by following formula:

$$p(z) = \prod_{i=1}^{d} p(z_i \mid z_{<i});$$

where p(z) is a latent space distribution; $p(z_i|z_{<i})$ is a conditional probability distribution; d represents dimension of a feature vector z; $z_i$ represents an ith dimension of the feature vector z; $z_{<i}$ represents a part of the feature vector z less than the ith dimension;

the memory module is configured to store the characteristic expression of the latent space, and then a characteristic expression that does not belong to the latent space will be forcibly converted into a most relevant characteristic expression in a memory by the memory module, with a process as follows:

$$\hat{z} = wM = \sum_{i=1}^{N} w_i * m_i;$$

where M is the memory module, ẑ is an expression to the characteristic, by the memory module, w represents a similarity between the latent space and each piece of memory, $m_i$ represents an ith block of memory of the memory module, $w_i$ represents a similarity between the feature vector z and $m_i$, N represents size of the memory module, $$w_i = \frac{\exp(d(z, m_i))}{\sum_{j=1}^{N} \exp(d(z, m_j))},$$

$$d(z, m_i) = \frac{z m_i^T}{\|z\| \|m_i\|};$$

where exp( ) represents an exponential function with e as base, $\|\cdot\|$ is a modulus operation, $m_i^T$ is transposition of $m_i$, and $m_j$ represents a jth block of memory of the memory module.

6. The autoregression image abnormity detection method of enhancing a latent space based on memory according to claim 5, wherein in Step 2, in the network structure:
an encoder network structure of the autoencoder comprises a down-sampling module, a down-sampling module and a fully connected layer, wherein each block uses a residual network structure and consists of three consecutive structures, namely convolutional layer+batch normalization+activation function, in cascade;
a decoder network structure of the autoencoder comprises a fully connected layer, an up-sampling module, an up-sampling module, and a convolutional layer wherein each block uses a residual network structure, and consists of three structures in cascade, whose sub-structures are respectively: transposed convolutional layer+batch normalization+activation function; convolutional layer+batch normalization+activation function; and transposed convolutional layer+batch normalization+activation function;
a network structure of the autoregression module is composed of multiple autoregression layers,
wherein an encoder in the autoencoder is expressed as a mathematical mode of z=en(X), and a decoder is expressed as a mathematical mode of X̂=de(z), the autoregression module $z_{dist}$=H(z) and ẑ act on z, and at this time X̂=de(ẑ).

7. The autoregression image abnormity detection method of enhancing a latent space based on memory according to claim 5, wherein Step 2 specifically comprises following steps:
Step 201: selecting a training set;
Step 202: analyzing information of the training set, wherein the training set information comprises image size, image intensity, and image noise;
Step 203: constructing a network structure applicable to current data according to the obtained information; and
Step 204: assembling an autoencoder, an autoregression module and a memory module together.

8. The autoregression image abnormity detection method of enhancing a latent space based on memory according to claim 5, wherein Step 3 specifically comprises following steps:
Step 301: reading image data;
Step 302: adjusting size of an image to a specific size;
Step 303: processing a certain amount of images that are different from an image space of overall data, which is specifically: transferring a gray space to a RGB space and a RGB space to a gray space; and
Step 304: performing a regularization operation on image data.

9. The autoregression image abnormity detection method of enhancing a latent space based on memory according to claim 5, wherein Step 4 is specifically: using different initialization methods to initialize a network, namely: using a random initialization method for an autoencoder and an autoregression module, and using a uniformly distributed initialization for a memory module.

10. The autoregression image abnormity detection method of enhancing a latent space based on memory according to claim 5, wherein Step 5 specifically comprises following steps:
Step 501: loading preprocessed data;
Step 502: setting learning rates for an autoencoder, an autoregression module, and a memory module, respectively;
Step 503: fixing the memory module and training the autoregression module;
Step 504: fixing the autoregression module and training the memory module; and
Step 505: performing Step 503 and Step 504 iteratively until the autoregression model of enhancing a latent space based on memory converges.

11. The autoregression image abnormity detection method of enhancing a latent space based on memory according to claim 5, wherein in Step 5, the model has a loss function of:

$$L=L_{rec}+\alpha L_{llk}+\beta L_{mem};$$

where $L_{rec}$ represents a reconstruction loss of an original image with respect to a reconstructed image;

$$L_{llk} = -\sum_{i=1}^{N}\log(z_{dist})$$

represents a negative log likelihood loss;

$$L_{mem} = \sum_{i=1}^{T}-\hat{w}_i\log(\hat{w}_i)$$

represents an entropy of a weight coefficient of a characteristic and a memory module; and $\alpha$, $\beta$ respectively represent weight coefficients of the loss function to balance a ratio of different losses, $\alpha$, $\beta$ are different for different data sets, as for MNIST and CIFAR10, $\alpha$ is equal to 1, and 0.1, respectively, and $\beta$ is equal to 0.0002, and 0.0002, respectively.

12. The autoregression image abnormity detection method of enhancing a latent space based on memory according to claim 5, wherein Step 6 is specifically: using a trained autoregression model of enhancing a latent space based on memory; inputting an image into the autoregression model of enhancing a latent space based on memory; acquiring a probability output by an autoregression module and a reconstruction difference between a reconstructed image of an autoencoder and an original image, respectively regarded as two fractions, and adding the two fractions to obtain a final fraction; and determining whether it is an abnormal image based on a previously set threshold.

13. The autoregression image abnormity detection method of enhancing a latent space based on memory according to claim 1, wherein in Step 2, in the network structure:
an encoder network structure of the autoencoder comprises a down-sampling module, a down-sampling module and a fully connected layer, wherein each block uses a residual network structure and consists of three consecutive structures, namely convolutional layer+batch normalization+activation function, in cascade;
a decoder network structure of the autoencoder comprises a fully connected layer, an up-sampling module, an up-sampling module, and a convolutional layer wherein each block uses a residual network structure, and consists of three structures in cascade, whose sub-structures are respectively: transposed convolutional layer+batch normalization+activation function; convolutional layer+batch normalization+activation function; and transposed convolutional layer+batch normalization+activation function;
a network structure of the autoregression module is composed of multiple autoregression layers, wherein an encoder in the autoencoder is expressed as a mathematical mode of z=en (X), and a decoder is expressed as a mathematical mode of $\hat{X}$=de(z), the autoregression module $z_{dist}$=H(z) and $\hat{z}$ act on z, and at this time $\hat{X}$=de($\hat{z}$).

14. The autoregression image abnormity detection method of enhancing a latent space based on memory according to claim 13, wherein the autoencoder processes an image with a processing comprising following steps of:
a. inputting an image with a size of N*N, wherein after an encoding stage of the autoencoder, its size of the autoregression model of enhancing a latent space based on memory becomes 2 times smaller after being subjected to a down-sampling module once, dimensions of a channel are in number which becomes from 1 to 32, and further to 64, and finally, it is input to a fully connected layer in the encoder after a leveling operation, and finally the latent space z∈ $R^{64}$ is obtained, and at this time z∈ $R^{64}$;
b. sending z to a memory module to obtain a similarity W between z and each block of memory, and performing, for one time, an operation $$h(w_i; y) = \begin{cases} w_i, & \text{if } w_i > y \\ 0, & \text{otherwise} \end{cases}$$

on W to obtain ŵ, and Finally making $$\hat{z} = \hat{w}M = \sum_{i=1}^{N} \hat{w}_i * m_i$$

expressed by a memory;
  c. making $Z \in R^{64}$ subjected to a fully connected layer of a decoder to obtain a characteristic of size of $$64 * \frac{N}{4} * \frac{N}{4},$$

and finally restoring to an original size after being subjected to an up-sampling module for two times, with dimensions of a channel of the up-sampling module in number which changes from 64 to 32, and further to 16; and
  d. restoring the characteristic to an original image space through a last convolutional layer.

15. The autoregression image abnormity detection method of enhancing a latent space based on memory according to claim 1, wherein Step 3 specifically comprises following steps:
  Step 301: reading image data;
  Step 302: adjusting size of an image to a specific size;
  Step 303: processing a certain amount of images that are different from an image space of overall data, which is specifically: transferring a gray space to a RGB space and a RGB space to a gray space; and
  Step 304: performing a regularization operation on image data.

16. The autoregression image abnormity detection method of enhancing a latent space based on memory according to claim 1, wherein Step 4 is specifically: using different initialization methods to initialize a network, namely: using a random initialization method for an auto-encoder and an autoregression module, and using a uniformly distributed initialization for a memory module.

17. The autoregression image abnormity detection method of enhancing a latent space based on memory according to claim 1, wherein Step 5 specifically comprises following steps:
  Step 501: loading preprocessed data;
  Step 502: setting learning rates for an autoencoder, an autoregression module, and a memory module, respectively;
  Step 503: fixing the memory module and training the autoregression module;
  Step 504: fixing the autoregression module and training the memory module; and
  Step 505: performing Step 503 and Step 504 iteratively until the autoregression model of enhancing a latent space based on memory converges.

18. The autoregression image abnormity detection method of enhancing a latent space based on memory according to claim 1, wherein in Step 5, the model has a loss function of:

$$L = L_{rec} + \alpha L_{llk} + \beta L_{mem};$$

where $L_{rec}$ represents a reconstruction loss of an original image with respect to a reconstructed image;

$$L_{llk} = -\sum_{i=1}^{N} \log(z_{dist})$$

represents a negative log likelihood loss;

$$L_{mem} = \sum_{i=1}^{T} -\hat{w}_i \log(\hat{w}_i)$$

represents an entropy of a weight coefficient of a characteristic and a memory module; and $\alpha$, $\beta$ respectively represent weight coefficients of the loss function to balance a ratio of different losses, $\alpha$, $\beta$ are different for different data sets, as for MNIST and CIFAR10, $\alpha$ is equal to 1, and 0.1, respectively, and $\beta$ is equal to 0.0002, and 0.0002, respectively.

19. The autoregression image abnormity detection method of enhancing a latent space based on memory according to claim 1, wherein Step 6 is specifically: using a trained autoregression model of enhancing a latent space based on memory; inputting an image into the autoregression model of enhancing a latent space based on memory; acquiring a probability output by an autoregression module and a reconstruction difference between a reconstructed image of an autoencoder and an original image, respectively regarded as two fractions, and adding the two fractions to obtain a final fraction; and determining whether it is an abnormal image based on a previously set threshold.

* * * * *